(12) United States Patent
Moffa

(10) Patent No.: US 11,390,214 B2
(45) Date of Patent: Jul. 19, 2022

(54) VEHICLE PASSENGER SENSING AND REPORTING SYSTEM

(71) Applicant: Freedman Seating Company, Chicago, IL (US)

(72) Inventor: Michael Douglas Moffa, Auburn, AL (US)

(73) Assignee: Freedman Seating Company, Chicago, IL (US)

( * ) Notice: Subject to any disclaimer, the term of this patent is extended or adjusted under 35 U.S.C. 154(b) by 0 days.

(21) Appl. No.: 16/598,459

(22) Filed: Oct. 10, 2019

(65) Prior Publication Data

US 2020/0047666 A1 Feb. 13, 2020

Related U.S. Application Data

(63) Continuation of application No. 16/298,200, filed on Mar. 11, 2019, now Pat. No. 10,457,208, which is a
(Continued)

(51) Int. Cl.
*B60Q 9/00* (2006.01)
*H04L 9/08* (2006.01)
(Continued)

(52) U.S. Cl.
CPC ............ *B60Q 9/00* (2013.01); *B60N 2/002* (2013.01); *B60R 16/0231* (2013.01);
(Continued)

(58) Field of Classification Search
CPC .......... B60Q 9/00; B60N 2/002; B60N 3/063; B60N 3/004; B60N 2/688; B60N 2/242; B60R 16/0231; B60R 22/48; B60R 2022/4808; B60R 2021/0067; B60R 2022/4866; B60R 2022/4816; B60R 2022/4825; B60R 21/015; H04L 9/088;
(Continued)

(56) References Cited

U.S. PATENT DOCUMENTS 3,720,711 A 6/1973 Bell
5,555,458 A 9/1996 Large
(Continued)

OTHER PUBLICATIONS

U.S. Patent and Trademark Office, Non-Final Office Action issued in U.S. Appl. No. 16/579,559, dated May 11, 2021, 13 pgs.

*Primary Examiner* — An T Nguyen
(74) *Attorney, Agent, or Firm* — Greenberg Traurig, LLP

(57) ABSTRACT

An example embodiment of a system and methods for detecting and reporting whether passengers are seated and secured in their seats within a vehicle may include a passenger sensor configured to provide an output indicative of a presence of a passenger in a seat in a vehicle, a restraint sensor configured to provide an output indicative of a status of a passenger safety restraint associated with the seat, a transmitter configured to be in electronic communication with the passenger sensor and the restraint sensor and to wirelessly transmit data indicative of the presence of a passenger in the seat and the status of the restrain, and a reporting module configured to be disposed proximate a driver of the vehicle. The reporting module may be configured to receive the data from the transmitter, and output a respective status for each of a plurality of seats.

18 Claims, 12 Drawing Sheets

Related U.S. Application Data continuation-in-part of application No. 15/974,318, filed on May 8, 2018, now abandoned.

(51) Int. Cl.
  *B60R 22/48* (2006.01)
  *B60R 16/023* (2006.01)
  *B60N 2/00* (2006.01)

(52) U.S. Cl.
  CPC .............. *B60R 22/48* (2013.01); *H04L 9/088* (2013.01); *B60R 2022/4808* (2013.01)

(58) Field of Classification Search
  CPC ............. B60K 35/00; B60K 2370/178; B60W 2040/0881
  See application file for complete search history.

(56) References Cited

U.S. PATENT DOCUMENTS

| | | | |
|---|---|---|---|
| 6,448,907 B1* | 9/2002 | Naclerio | B64D 25/06 340/945 |
| 6,462,701 B1* | 10/2002 | Finn | B60R 21/01516 280/735 |
| 6,485,057 B1 | 11/2002 | Midorikawa | |
| 6,888,475 B2* | 5/2005 | Darr | B60R 22/321 340/945 |
| 6,904,541 B1 | 6/2005 | MacArthur | |
| 7,383,911 B2* | 6/2008 | Schondorf | B60R 22/48 180/268 |
| 8,005,595 B2* | 8/2011 | Marriott | B60R 21/01546 701/45 |
| 9,033,215 B1* | 5/2015 | Ashford | G06K 9/22 235/375 |
| 9,282,530 B1* | 3/2016 | Couleaud | H04W 24/08 |
| 9,908,625 B2* | 3/2018 | Goyal | B64D 25/02 |
| 10,457,208 B1* | 10/2019 | Moffa | B60N 2/242 |
| 2002/0184062 A1 | 12/2002 | Diaz | |
| 2005/0087381 A1* | 4/2005 | Tobata | B60R 21/013 180/271 |
| 2005/0156726 A1 | 7/2005 | Rubel | |
| 2005/0209754 A1 | 9/2005 | Kiribayashi | |
| 2007/0205884 A1* | 9/2007 | Federspiel | B60N 2/002 340/457.1 |
| 2007/0254609 A1 | 11/2007 | Rosenthal et al. | |
| 2009/0088928 A1* | 4/2009 | Schroeder | G01C 21/3641 701/45 |
| 2009/0132128 A1* | 5/2009 | Marriott | B60R 22/48 701/45 |
| 2009/0201141 A1* | 8/2009 | Teshome | B60R 22/48 340/457.1 |
| 2009/0243842 A1 | 10/2009 | Mitchell et al. | |
| 2010/0253498 A1 | 10/2010 | Rork | |
| 2013/0006674 A1 | 1/2013 | Bowne et al. | |
| 2014/0125355 A1* | 5/2014 | Grant | G01R 27/2605 324/629 |
| 2014/0278841 A1* | 9/2014 | Natinsky | G07B 15/063 705/13 |
| 2014/0313057 A1* | 10/2014 | Kokal | G06K 9/00838 340/928 |
| 2016/0146335 A1 | 5/2016 | McGuire | |
| 2016/0272150 A1 | 9/2016 | Doshi et al. | |
| 2016/0283962 A1* | 9/2016 | Chan | G06Q 30/0222 |
| 2016/0374002 A1 | 12/2016 | Tuluca | |
| 2017/0036764 A1* | 2/2017 | Goyal | B64D 11/0015 |
| 2017/0129399 A1* | 5/2017 | Appukutty | B60N 2/2872 |
| 2017/0144774 A1* | 5/2017 | Pollard | B64D 11/062 |
| 2017/0180919 A1* | 6/2017 | Rittner | H02J 7/025 |
| 2017/0283086 A1* | 10/2017 | Garing | B64D 45/0005 |
| 2018/0308527 A1 | 10/2018 | Narayanan et al. | |
| 2019/0027011 A1* | 1/2019 | Gordon | B60N 2/286 |
| 2020/0017068 A1 | 1/2020 | Moffa et al. | |
| 2020/0070772 A1* | 3/2020 | Kim | B60Q 9/00 |

* cited by examiner

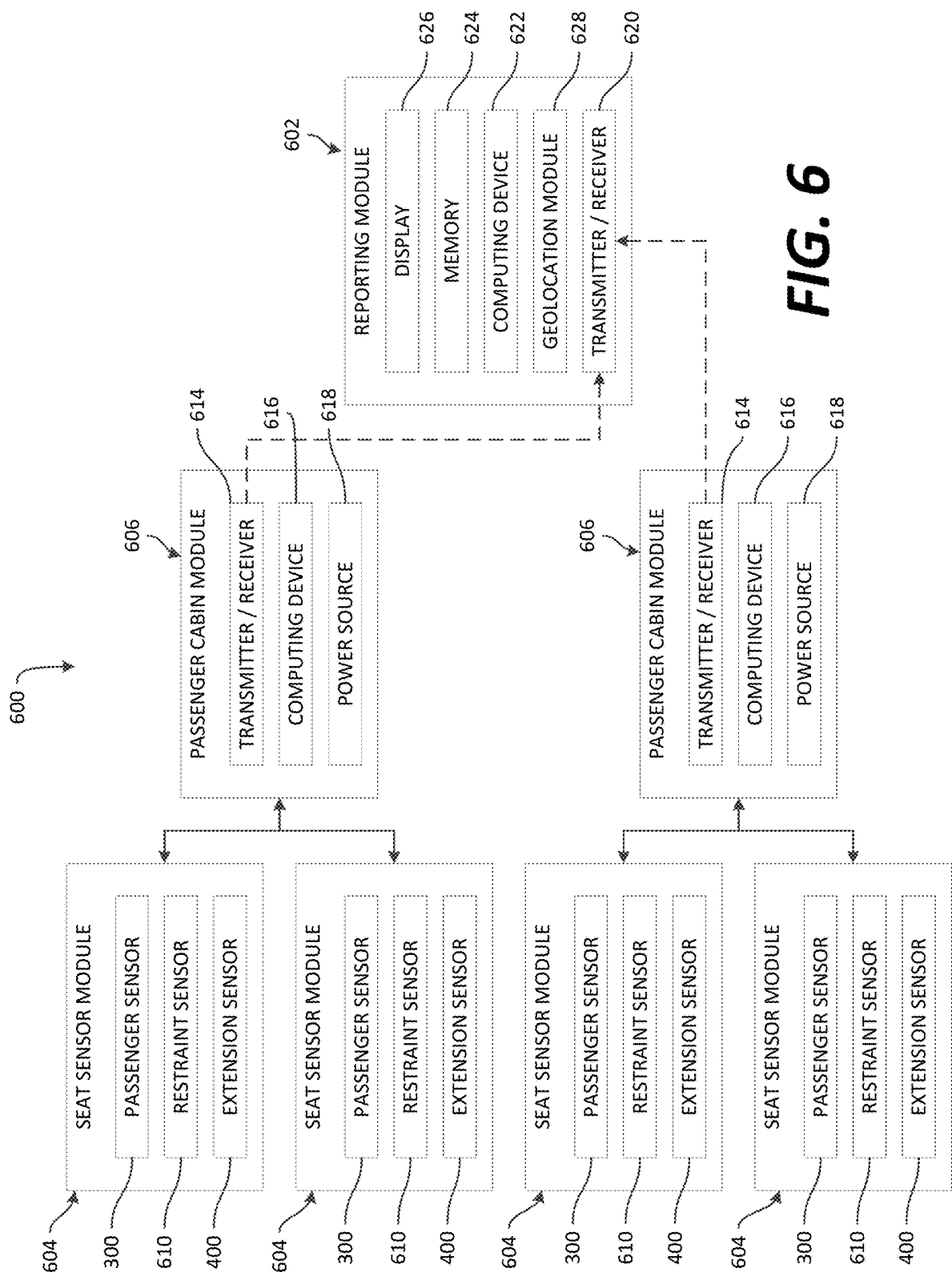

VEHICLE PASSENGER SENSING AND REPORTING SYSTEM

CROSS-REFERENCE TO RELATED APPLICATION

This application is a continuation of U.S. application Ser. No. 16/298,200, currently pending, which is a continuation-in-part of U.S. application Ser. No. 15/974,318, the entireties of which are hereby incorporated by reference.

FIELD OF THE DISCLOSURE

This disclosure relates to methods, systems, and modules for detecting whether passengers in a vehicle are seated and secured in their seats in a passenger bus, car, or other vehicle, and for reporting to the vehicle operator whether their passengers are seated and secured within the vehicle.

BACKGROUND

Buses and other mass transit vehicles generally include numerous seats which may or may not be occupied at any given time and safety restraints (e.g., seatbelts) that may or may not be secured properly. An operator of the vehicle (e.g., a driver) may wish to confirm that all of their seated passengers have their safety restraints correctly engaged (e.g., buckled) during operation of the vehicle.

SUMMARY

An example embodiment of a reporting module for a seat sensing system for a vehicle may include a display configured to be disposed proximate an operator of the vehicle, a receiver configured to receive wireless communications, and a computing device. The computing device may be configured to determine, according to the received wireless communications, the respective locations of a plurality of seats in the vehicle, generate a graphical layout of the plurality of seats according to the determined locations, determine a passenger status and restraint status of each of the plurality of seats in the vehicle based on the communications, and operate the display to output the graphical layout of the plurality of seats, the graphical layout comprising the passenger status and restraint status of each of the plurality of seats, for the operator of the vehicle.

An example embodiment of a reporting module for a seat sensing system for a vehicle may include a display configured to be disposed proximate an operator of the vehicle, a receiver configured to receive wireless communications, a computer-readable memory, a universal power supply, and a computing device. The computing device may be configured to determine a passenger status and restraint status of each of a plurality of seats in the vehicle based on the communications, operate the display to output the passenger status and restraint status of each of the plurality of seats for the operator of the vehicle, transfer the passenger status and restraint status of each of the plurality of seats to the memory for storage, receive an indication from the universal power supply that a primary power source has been deactivated during a pending transfer of the passenger status and restraint status of at least one of the seats and, responsive to receiving the indication, complete the pending transfer and shut down after completing the pending transfer.

An example embodiment of a passenger sensing and reporting system for a vehicle having a plurality of seats may include a passenger sensor configured to provide an output indicative of a presence of a passenger in a seat in the vehicle, a restraint sensor configured to provide an output indicative of a status of a passenger safety restraint associated with the seat, a transmitter configured to be in electronic communication with the passenger sensor and the restraint sensor and to wirelessly transmit data indicative of the presence of a passenger in the seat and the status of the restraint, and a reporting module configured to be disposed proximate a driver of the vehicle. The reporting module may be configured to receive the data from the transmitter and output a respective status for each of a plurality of seats, the plurality of seats including the seat, the status of the seat being based on the data. The reporting module may be further configured to transmit a signal for the passenger sensor or the restraint sensor that alters the sensitivity of the passenger sensor or the restraint sensor, or interpret the data from the transmitter according to a size of a passenger seated in the seat.

BRIEF DESCRIPTION OF THE DRAWINGS

FIG. 6 is a diagrammatic view of an example embodiment of a passenger and safety restraint sensing and reporting system for a vehicle.

DETAILED DESCRIPTION

Current buses and other multi-passenger vehicles, such as airplanes, boats, and the like, generally do not include systems for quickly, effectively, and easily determining whether passengers are seated and whether their seatbelts or other safety restraints are properly secured. For example, commercial passenger buses generally do not include any techniques, other than by manual inspection, for the driver to confirm that all passengers are safely seated and buckled in. Similarly, it is common practice for flight attendants on commercial aircraft to walk through the passenger cabin and manually inspect each passenger to confirm that each passenger is seated and that each passenger's seatbelt is buckled. Such visual inspections can be time-consuming and may be ineffective, as passengers may unbuckle their seatbelts or get up from their seats immediately after such inspection, unbeknownst to the vehicle operator or attendant.

Systems and methods for automatically detecting whether a passenger is present in a seat of a vehicle, whether that passenger's seatbelt or other safety restraint is secured, and/or whether that safety restraint is in a proper position would improve passenger safety by ensuring that a vehicle operator can be aware if any passenger is not safely secured and respond accordingly. For example, the operator may instruct the passenger to sit down and/or secure his or her seatbelt or other safety restraint, or may stop the vehicle or delay movement of the vehicle altogether until each passenger is detected as being seated and safely buckled in.

Figure 1:
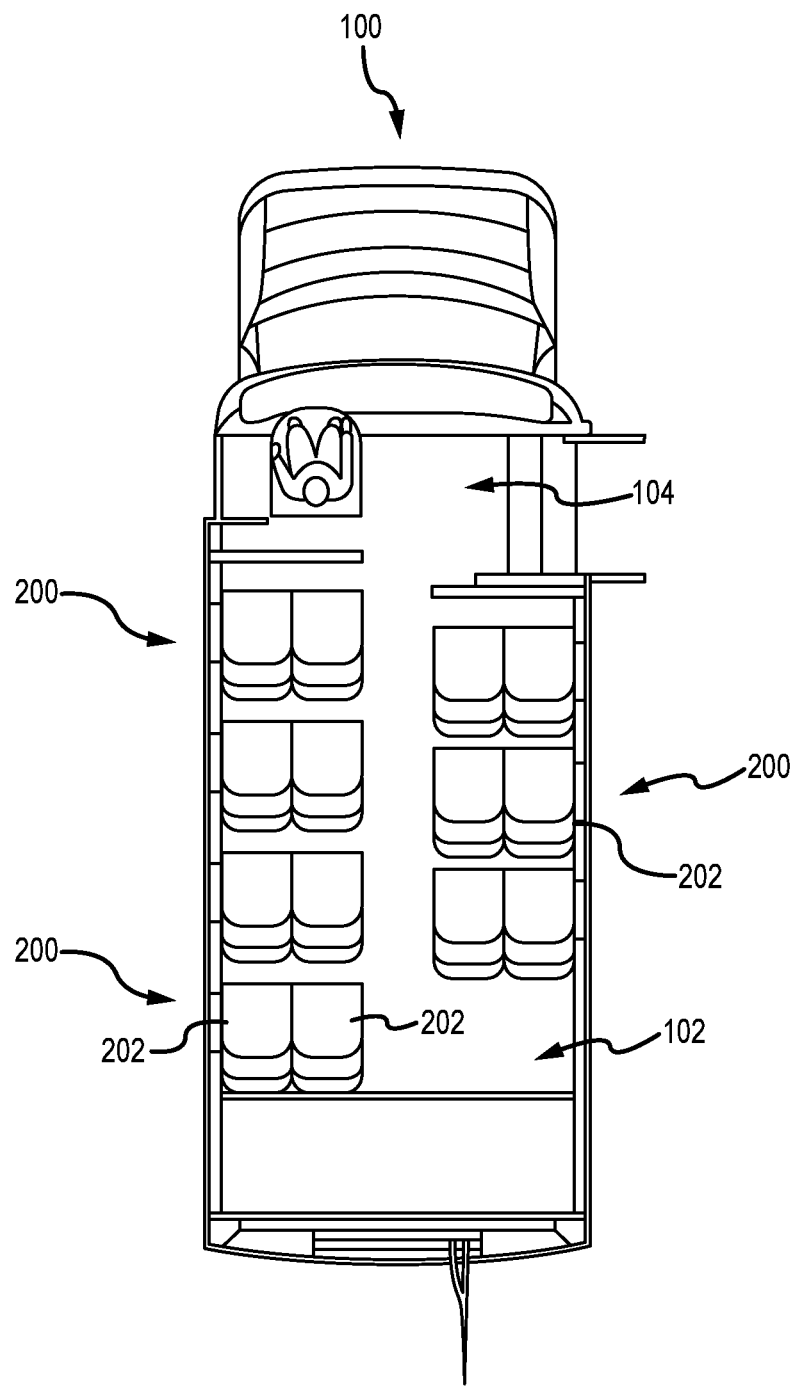
FIG. 1 is a top plan diagrammatic view of an example embodiment of a passenger vehicle in which a passenger and safety restraint sensing and reporting system may be used.

FIG. 1 is a diagrammatic view of an example embodiment of a vehicle, namely, passenger bus 100, which includes passenger compartment 102 and operator compartment 104. Passenger compartment 102 includes a plurality of passenger seats 202, with passenger seats 202 arranged in sets 200 of two seats 202 apiece. It should be noted that, for clarity of illustration, not all seats 202, and not all sets 200, are designated in FIG. 1.

Figure 2A:
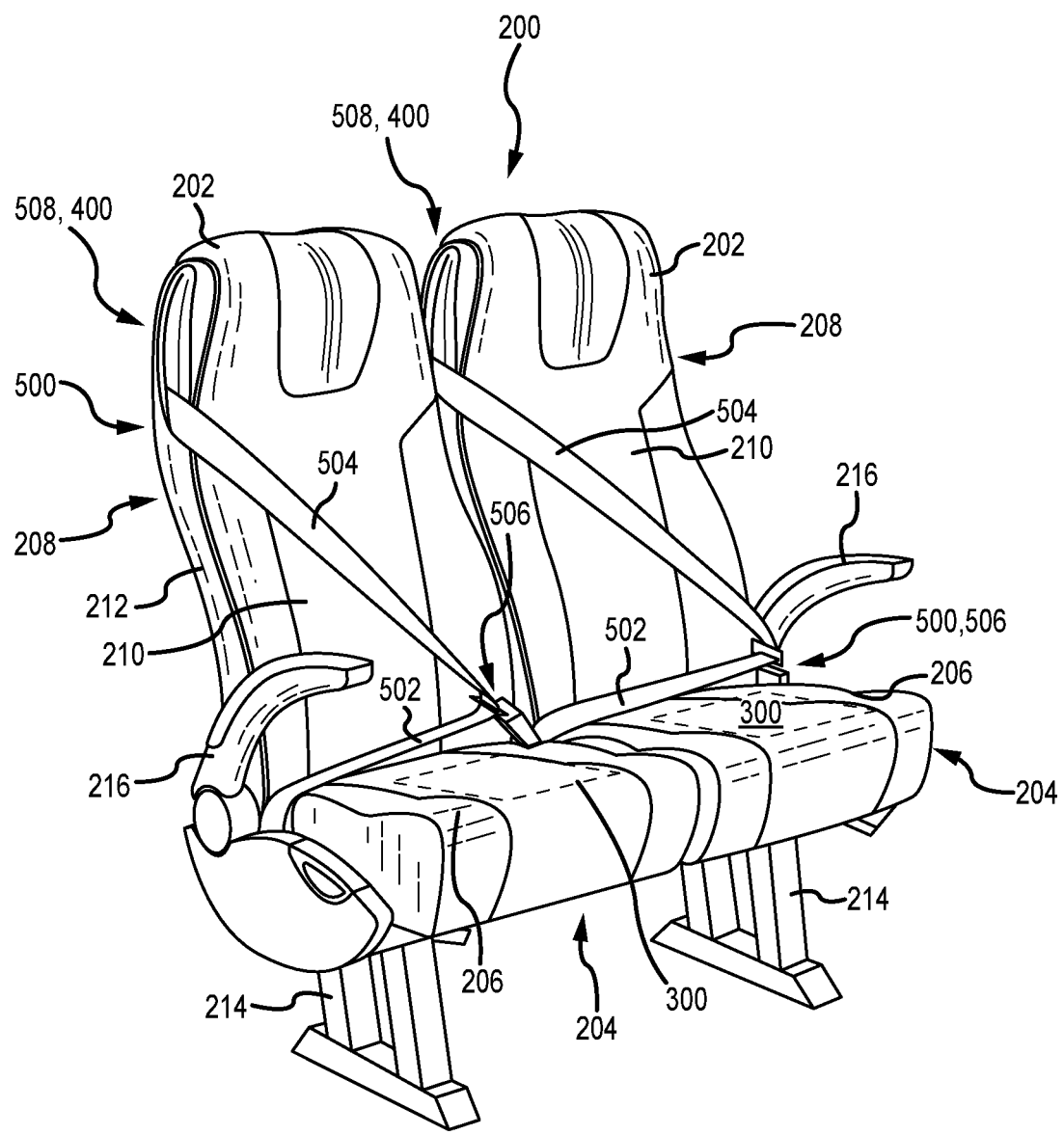
FIG. 2A is a front perspective view of an example embodiment of a set of two seats, each seat including a respective safety restraint, which may be used in conjunction with the passenger and safety restraint sensing and reporting system.

FIG. 2A is a front perspective view of set 200 of seats 202 that may find use in a vehicle, such as bus 100, for example. Set 200 of seats 202 includes two seats 202. Each seat 202 may include base portion 204, backrest portion 208, seat support 214, one or more arm supports 216, and passenger safety restraint 500. Base portion 204 includes base cushion 206, and backrest portion 208 includes back cushion 210 and housing 212. In the embodiment illustrated in FIG. 2, passenger safety restraint 500 is a three-point seatbelt that includes lap belt portion 502, chest belt portion 504, buckle 506, and spool 508. Spool 508 may be integrated into housing 212 of backrest portion 208, as illustrated in FIG. 2.

Figure 2B:
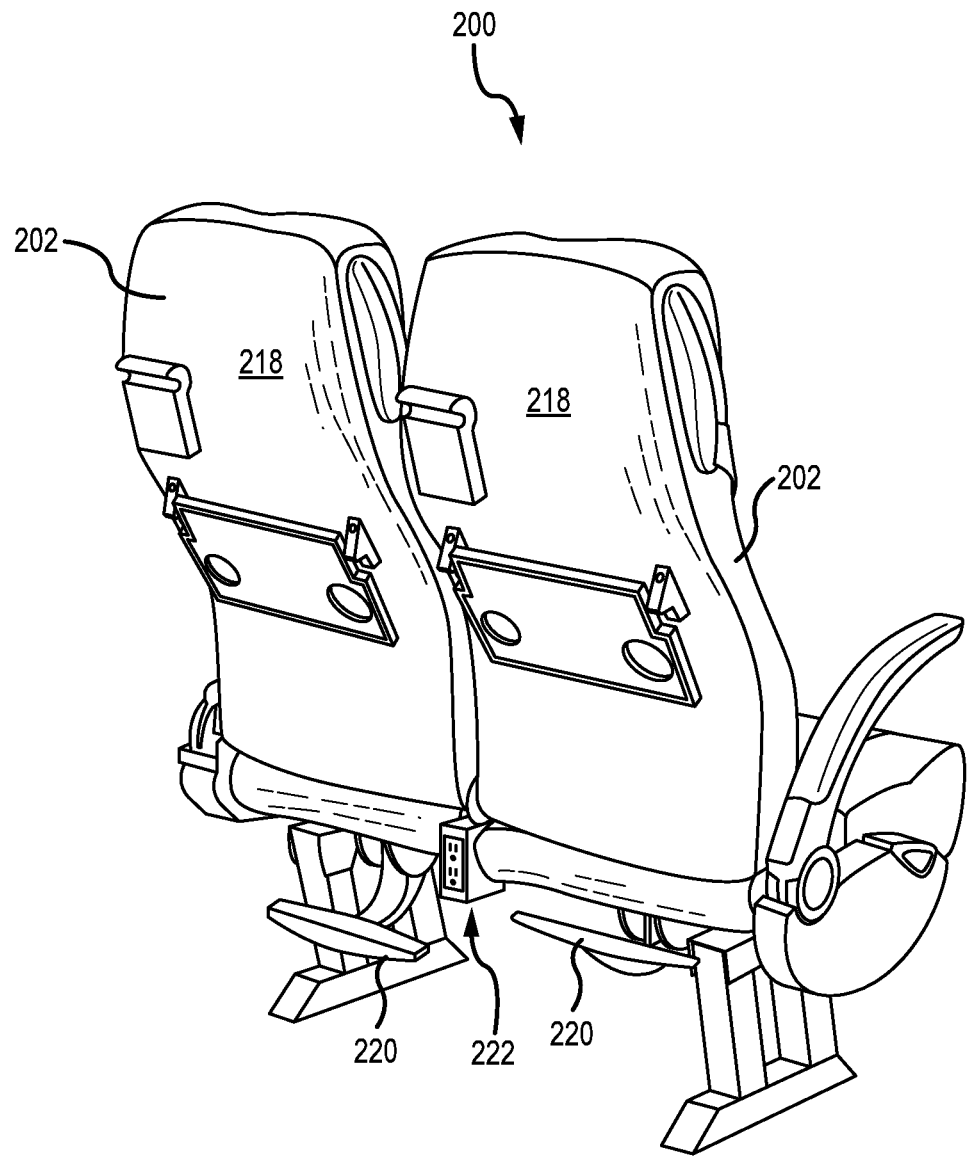
FIG. 2B is a rear perspective view of the example set of seats of FIG. 2A.

FIG. 2B is a rear perspective view of set 200 of seats 202. As illustrated in FIG. 2B, each seat 202 may include rear portion 218 (e.g., the rear side of backrest portion 208) and footrest 220 for the passenger location in the seat behind seat 202. One or more power supplies 222 may be integrated into set 200 of seats 202, such that set 200 may have a common power supply 222 (as shown in FIG. 2B), or each seat may have its own power supply 222 (that is, set 200 of two seats 202 may include two power supplies 222). Power supply or supplies 222 for seat set 200 may be electrically coupled to the main electrical system of the vehicle and thus may draw power from a battery associated with the engine of the vehicle, or from the engine, in an embodiment. In other embodiments, power supply 222 may draw power from a passive power source that is separate from the main electrical system of the vehicle. For example, power supply 222 may draw power from a piezoelectric power generator disposed in or on seat 202—which may generate power based on vibrations of the vehicle in which it is disposed—and an associated power storage device (e.g., a supercapacitor or battery). Additionally, or alternatively, power supply 222 may draw power from a solar cell 224 disposed on or around the seat 202. Solar cell 222 may be disposed on the top of the headrest at the top of backrest 208 of the seat closest to the window, for example. Such a passive power system may also be used to provide power to the various sensors and other components of a passenger sensing and reporting system of this disclosure.

Figure 3:
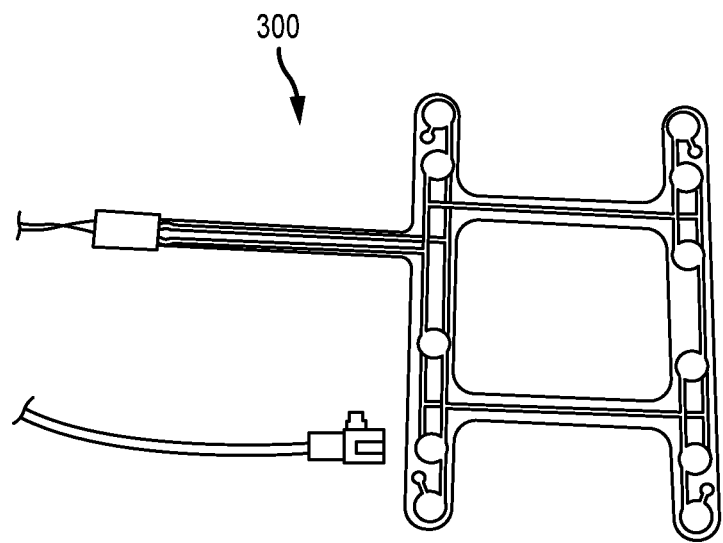
FIG. 3 is a perspective view of an example embodiment of a passenger sensor that may find use in the passenger and safety restraint sensing and reporting system.

Referring to FIGS. 2A, 2B, and 3, respective passenger sensors 300 may be disposed in base cushions 206. FIG. 3 is a perspective view of an example embodiment of passenger sensor 300, in the form of a pressure sensor. Passenger sensor 300 may be configured to detect the presence of a passenger in the seat 202 and to produce an output indicative of whether a passenger is present (e.g., seated) in the seat. As illustrated in FIG. 3, passenger sensor 300 may be or may include a pressure sensor, in some embodiments. In other embodiments, passenger sensor 300 may be or may include a proximity sensor, touch sensor, motion sensor, a temperature sensor, radar/Lidar sensor, pneumatic sensor, hydraulic sensor, or other sensor capable of producing an output indicative of the presence of a passenger on a seat (e.g., based on the weight, heat, movement, etc. of the passenger). Passenger sensor 300 may be disposed in base portion 204 (e.g., in base cushion 206), in some embodiments. For example, passenger sensor 300 may be arranged such that a passenger's weight on base 204 closes a switch in passenger sensor 300, thereby indicating the presence of the passenger. In other embodiments, passenger sensor 300 may be disposed in backrest portion 208 or arm support 216 of the seat, on seat support 214, or at another location proximate seat 202 that enables passenger sensor 300 to detect the presence of a seated passenger. Passenger sensor 300 may produce a binary output, in an embodiment (e.g., in which a first output of two possible outputs is indicative of a passenger, and the second output is indicative of a lack of a passenger). In other embodiments, passenger sensor 300 may produce a spectrum of outputs (e.g., pressure values) that may be interpreted to determine if a passenger is present. For example, passenger sensor 300 may output a range of analog or digital values which can be interpreted to determine if a passenger is present in the seat, and in an embodiment, may be able to quantify whether the passenger displaces the weight of a child or the weight of an adult, to notify the operator of the difference.

Figure 4:
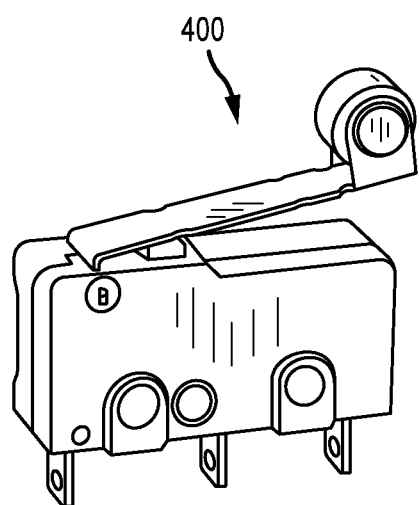
FIG. 4 is a perspective view of an example embodiment of a restraint extension sensor that may find use in the passenger and safety restraint sensing and reporting system.

Referring to FIGS. 2A and 4, respective restraint extension sensors 400 may be disposed in or on spools 508. FIG. 4 is a perspective view of an example embodiment of restraint extension sensor 400, in the form of a limit switch, that may measure the extension of chest belt portion 504 from spool 508 and produce an output indicative of that extension. Whether as a limit switch or in another form, safety restraint extension sensor 400 may be configured to detect an extension of safety restraint 500 and to produce an output indicative of an extension of safety restraint 500. For example, safety restraint extension sensor 400 may be configured to detect and output a numerical measurement of the extension of safety restraint 500, whether safety restraint 500 is or is not extended too far, and/or whether safety restraint 500 is or is not extended enough. The output of safety restraint extension sensor 400 may be indicative of whether a passenger is wearing safety restraint 500 properly and safely, in embodiments. Restraint extension sensor 400 may produce a binary output, in an embodiment (e.g., in which a first output is indicative of the restraint being sufficiently extended, and a second output is indicative of the restraint not being sufficiently extended). In other embodiments, restraint extension sensor 400 may produce a spectrum of outputs (e.g., extension measurement values) that may be interpreted to determine if safety restraint 500 is properly extended.

As shown in FIG. 2A and as noted above, safety restraint extension sensor 400 may be disposed in or on spool 508, or in or on another location from which safety restraint extension sensor 400 can detect extension of chest belt portion 504, lap belt portion 502, and/or another portion of safety restraint 500.

Figure 5A:
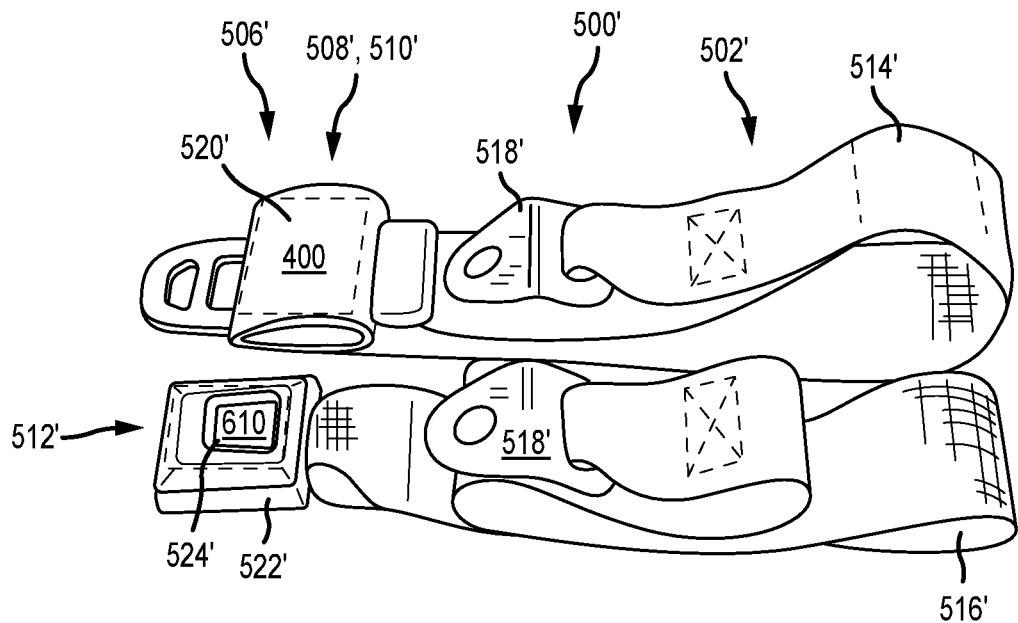
FIG. 5A is a perspective view of an example embodiment of a passenger safety restraint which may be used in conjunction with a passenger and safety restraint sensing and reporting system.

FIG. 5A is a perspective view of an embodiment of example passenger safety restraint 500', in the form of a two-point seatbelt. Seatbelt 500' may find use in place of safety restraint 500, or in conjunction with any appropriate seat. Seatbelt 500' may include buckle 506', which includes male buckle portion 510' and female buckle portion 512', and lap belt portion 502', which includes first and second lap belt sub-portions 514', 516', each associated with a respective anchor 518'. Male and female buckle portions 510', 512' may include respective housings 520', 522', and female buckle portion 512' may include release 524'. Male buckle portion 510' may also include pulley-style (e.g., spring-biased) spool 508' for extending and retracting seatbelt 500'. Safety restraint extension sensor 400 may be disposed in or on spool 508'.

Figure 5B:
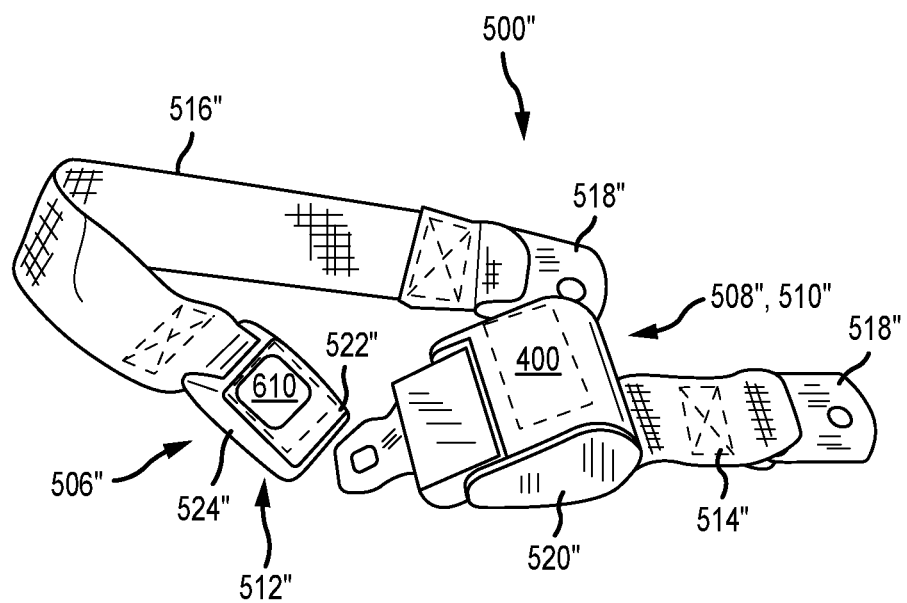
FIG. 5B is a perspective view of an example embodiment of a passenger safety restraint which may be used in conjunction with the passenger and safety restraint sensing and reporting system.

FIG. 5B is a perspective view of another example passenger safety restraint 500", in the form of a two-point seatbelt. Seatbelt 500" may find use in place of safety restraint 500, or in conjunction with any appropriate seat. Seatbelt 500" may include buckle 506", which includes male buckle portion 510" and female buckle portion 512", and lap belt portion 502" including first and second lap belt sub-portions 514", 516", each associated with a respective anchor 518". Male and female buckle portions 510", 512" may include respective housings 520", 522", and female buckle portion 512" may include release 524". Seatbelt 500" may further include bobbin-style spool 508" for extending and retracting seatbelt 500". Safety restraint extension sensor 400 may be disposed in or on spool 508".

Referring to FIGS. 5A and 5B, safety restraint 500', 500" may include a safety restraint sensor 610. Safety restraint sensor 610 may be configured to detect and produce an output indicative of whether safety restraint 500', 500" is secured. For example, safety restraint sensor 610 may be configured to detect and output an indication of whether safety restraint 500', 500" or other restraint is buckled (e.g., whether male buckle portion 510, 510" is inserted into female buckle portion 512', 512"). Safety restraint sensor 610 may be used in conjunction with a two-point seatbelt, three-point seatbelt, four-point, five-point, six-point, or seven-point harness, or other passenger safety restraints. Restraint sensor 610 may produce a binary output, in an embodiment (e.g., in which a first output is indicative of restraint 500', 500" being buckled, and a second output is indicative of restraint 500', 500" not being buckled). In other embodiments, restraint sensor 610 may produce a spectrum of outputs (e.g., an analog range of electrical current values) that may be interpreted to determine if safety restraint 500', 500" is buckled.

In an embodiment, safety restraint sensor 610 may be disposed in, on, or near, or may be otherwise coupled to, buckle 506', 506" of safety restraint 500', 500", in some embodiments. For example, safety restraint sensor 610 may be disposed in a housing of the buckle, such as a housing of female buckle portion 512', 512". In an embodiment, safety restraint sensor 610 may include an electrical switch that is closed when safety restraint 500', 500" is buckled (e.g., whether male buckle portion 510', 510" is inserted into female buckle portion 512', 512"). Safety restraint sensor 610 may additionally or alternatively include a magnetic sensor or other sensor for detecting the closing of buckle 506', 506" or other closure member. Safety restraint sensor 610 may be configured to indicate whether the buckle 506', 506" is open or closed. As will be described with respect to FIGS. 6 and 8, a reporting module (e.g., reporting module 602 of FIG. 2) or other hardware or software may be configured to interpret the output of safety restraint sensor 610 to determine whether the buckle 506', 506" is open or closed.

FIG. 6 is a diagrammatic view of example passenger detection and reporting system 600. System 600, or portions thereof, may be deployed in a passenger vehicle, such as a bus, train, car, limousine, watercraft, airplane, or other vehicle. The remainder of this disclosure will discuss the structure and use of system 600 in a bus. Such description is by way of example only, and system 600 is not limited to use in any particular context except as explicitly set forth in the claims.

System 600 may include reporting module 602, one or more (e.g., a plurality of) seat sensor modules 604, and one or more (e.g., a plurality of) passenger cabin modules 606. Reporting module 602, or portions thereof, may be disposed proximate an operator of the vehicle, in an embodiment (e.g., in operator cabin 104 (see FIG. 1)). For example, reporting module 602 may be disposed next to or in a driver dashboard in a bus. Each seat module 604, or portions thereof, may be disposed in or on a respective seat, and each passenger cabin module 602, or portions thereof, may be disposed in a passenger cabin of the vehicle, in an embodiment (e.g., in passenger cabin 102 (see FIG. 1)). Broadly, each seat sensor module 604 may detect the presence or absence of a passenger in a respective seat, as well as whether that seat's seatbelt or other safety restraint is secured and/or extended. Passenger cabin module(s) 606 may provide power to seat sensor modules 604 and report the respective statuses of the seats (where a state of a seat may include or subsume one or more of a passenger status, a restraint buckled status, or a restraint extension status) to reporting module 602, which may display the respective states of the seats for the operator of the vehicle.

In the example of FIG. 6, system 600 includes four seat sensor modules 604, each of which may be associated with a respective seat, and two passenger cabin modules 606, each associated with a pair of seats. For example, referring to FIGS. 1, 2A, 2B, and 6, each seat sensor module 604 may be associated with a respective seat 202, in an embodiment, and a passenger cabin module 606 may be associated with set 200 of seats 202, in an embodiment. If such an arrangement were applied in bus 100 of FIG. 1, for example, an example system may include fourteen seat sensor modules 604 (one for each seat 202), seven passenger cabin modules 606 (one for each seat pair 200), and one reporting module 602. This arrangement is described as an example only. In other example embodiments, a respective passenger cabin module 606 may be provided for each seat sensor module 604, or a single passenger cabin module 606 may be provided for all seat sensor modules 604, or a given passenger cabin module 606 may support three, four, or any other number of seat sensor modules 604.

Each seat sensor module 604 may include passenger sensor 300, restraint sensor 610, and restraint extension sensor 400. Each seat sensor module 604 may be associated with a particular seat and, as described below, each seat sensor module 604, or portions thereof (e.g., one or more of the sensors 300, 610, 400), may be disposed in, on, or near various portions of the seat or may be otherwise coupled with the seat so as to serve the particular function of the sensor 300, 610, 400.

Each passenger cabin module 606 may include transmitter/receiver 614, computing device 616, and power source 618, in an embodiment. Passenger cabin module 606 may be in electrical communication with one or more seat sensor modules 604 for the exchange of data and electrical power. In the embodiment illustrated in FIG. 6, each passenger cabin module 606 is in electrical communication with two seat sensor modules 604 for the exchange of data and electrical power.

Power source 618 may be configured to provide power to the other components of the passenger cabin module 606 (e.g., the computing device 616 and transmitter/receiver 614), and/or to one or more components of one or more seat sensor modules 604 (e.g., one or more passenger sensors 300, one or more restraint sensors 610, and one or more restraint extension sensors 400). In the embodiment illustrated in FIG. 4, power source 618 of each passenger cabin module 606 is configured to provide power for the components of two seat sensor modules 604.

In some embodiments, power source 618 of the passenger cabin module 606 may be separate from the vehicle electrical system. Accordingly, one or more seat sensor modules 604, and sensors 300, 610, 400 thereof, may draw power from power source 618 that is separate from the electrical system of the vehicle. For example, power source 618 may be or may include a passive power supply that includes a power generator and a power storage device. The power generator may be or may include a piezoelectric generator configured to produce electrical current or potential in response to vibrations or other movement of the vehicle, in some embodiments. In other embodiments, the power generator may be a solar cell. The power generator may be disposed in or on a seat. For example, referring to FIG. 2A, the power generator may be disposed in a cushion 206, along with passenger sensor 300; referring to FIG. 2B, the power generator may be disposed on top of a head rest atop backrest 208. Alternatively, the power generator may be coupled to seat support 214 or coupled to or disposed in backrest portion 208. The power storage device may be a battery, supercapacitor, or other appropriate electrical power storage device. Like the power generator, the power storage device may be disposed in a cushion 206, along with passenger sensor 300, may be coupled to seat support 214, or may be coupled to or disposed in backrest portion 208, for example.

In other embodiments, power source 618 of the passenger cabin module 606 may be or may draw power from the vehicle electrical system. For example, referring to FIGS. 2B and 6, passenger cabin module power source 618 may be, or may be electrically coupled to, power supply 222. As a result, passenger cabin module power supply 618 may be connected to the vehicle power system separately from a power source that is accessible to a passenger.

With continued reference to FIG. 6, computing device 616 may be configured to receive the output of one or more sensors (e.g., one or more passenger sensors 300, one or more restraint sensors 610, and/or one or more restraint extension sensors 400) and to interpret and/or package that output for communication to reporting module 602. Computing device 616 may be or may include a microcontroller, or otherwise may be or may include a computer-readable memory and a processor executing instructions stored in that memory to perform one or more of the functions of a computing device described herein. In some embodiments, computing device 616 may periodically read or otherwise receive the respective outputs (e.g., in analog or digital form) of one or more passenger sensors 300, one or more restraint sensors 610, one or more restraint extension sensors 400, and/or one or more other sensors and cause data to be transmitted to reporting module 602 that is indicative of those respective outputs, such that reporting unit 602 may use that data as a basis to provide an output to the operator of a vehicle indicative of whether one or more passengers are seated and/or whether their safety restraints are properly and safely secured. Computing device 616 may receive data from one or more of sensors 300, 610, 400 over one or more wired connections, in some embodiments. In other embodiments, computing device 616 may receive data from the one or more sensors 300, 610, 400 over one or more wireless connections.

Computing device 616 may exercise some control over one or more of the sensors 300, 610, 400, in some embodiments. For example, computing device 616 may be configured to disable (e.g., cut power to), reset, program (e.g., set the sensitivity of or otherwise calibrate), or otherwise provide input to one or more of sensors 300, 610, 400. For example, computing device 616 may be configured to increase the sensitivity of passenger sensor 300 and/or restraint extension sensor 400 for a seat in which a small child will sit for a particular trip. Additionally or alternatively, computing device 616 may be configured to interpret the output of one or more sensors 300, 610, 400 differently in different situations (e.g., a small child occupying, or being expected to occupy, a seat), rather than programming sensor 300, 610, 400, or to ignore the output of sensor 300, 610, 400 rather than disabling it. Computing device 616 may be configured to exercise such control over one or more of sensors 300, 610, 400, and/or over interpretation of the outputs of sensors 300, 610, 400, according to commands from reporting module 602, in some embodiments.

Transmitter/receiver 614 may be configured to transmit data from passenger cabin module 606 (e.g., to reporting module 602) and to receive data (e.g., from reporting module 602) for use by passenger cabin module 606 and/or one or more seat sensor modules 604. In some embodiments, transmitter/receiver 614 may be configured for wireless communications with reporting module 602, as indicated by the dashed lines in FIG. 6. Wireless communications between passenger cabin module 606 and reporting module 602 may enable simplified aftermarket installation of the system 600 in a vehicle by eliminating the need to extend new wired connections from the passenger cabin to the operator cabin, which may serve as a tripping hazard to passengers if not secured and placed properly. In an embodiment, transmitter/receiver 614 may communicate over RF, Bluetooth, WiFi, WiMAX, or any other appropriate wireless communication protocol or frequency band. Transmitter/receiver 614 may be or may include an RFID tag or may otherwise transmit communications associated with a unique identifier.

Transmitter/receiver 614 may be configured to encrypt transmissions and to decrypt received data, in some embodiments. For example, transmitter/receiver 614 may be configured for communications with AES encryption. In embodiment, each transmitter/receiver 614 on a given vehicle may use a common encryption key that is unique from other vehicles, for example, to avoid cross-talk between seating systems stored in separate vehicles that travel near to each other, and also to maintain the security of communications between each transmitter/receiver 614 and the reporting module 602. In addition to, or instead of, separate encryption keys, each transmitter/receiver 614 in a given vehicle may be associated with a common channel, and each transmitter/receiver 614 may have a unique device identifier included in its transmissions, to prevent cross-talk with other vehicles.

With continued reference to FIG. 6, each passenger cabin module 606 and/or seat sensor module 604 may be encoded with, or may store, its location in a vehicle after module 604, 606 is installed in the vehicle. Such a location may include, for example, a row (e.g., row 1, row 2, row 3, etc.) and a position, which position may include, for example, a side of the vehicle (e.g., left or right) and a specifier within that side (e.g., window, aisle, middle). For example, module 604, 606 may include or may be associated with installation software in which a user manually selects the location of the seat, in an embodiment. Additionally or alternatively, a passenger cabin module 606 and/or seat sensor module 604 may include external switches through which a user may select a location in which the module 604, 606 is installed.

Reporting module 602 may be generally configured to receive data indicative of the outputs of sensors 300, 610, 614 and to output, for an operator of the vehicle, indications of whether passengers are seated and whether their safety restraints are properly secured. Reporting module 602 may include transmitter/receiver 620, computing device 622, memory 624, and display 626.

Transmitter/receiver 620 may be configured to receive data from one or more passenger cabin modules 606 that is indicative of the output of one or more passenger sensors 300, one or more restraint sensors 610, and one or more restraint extension sensors 400, and indicative of the respective seats associated with each of those outputs. Accordingly, the received data may be indicative of a status of one or more seats. In some embodiments, transmitter/receiver 620 may be configured for wireless communications with passenger cabin module(s) 606, as indicated by the dashed lines in FIG. 6. In an embodiment, transmitter/receiver 620 may communicate over RF, Bluetooth, WiFi, WiMAX, or any other appropriate wireless communication protocol or frequency band. Transmitter/receiver 620 may be or may include an RFID reader, in an embodiment.

Display 626 may be or may include a computer monitor or similar general purpose display, in some embodiments, such as an LED or LCD monitor. Additionally or alternatively, display 626 may be or may include a specific-purpose display. For example, display 626 may be or may include a light board including a plurality of light portions, each portion dedicated to a particular seat of the vehicle, and each portion capable of providing a plurality of outputs indicative of respective states of the seat. Such states may include, for example, a "passenger not present" (e.g., "open seat") state, a "passenger present and not buckled" state, a "passenger present and buckled, but not properly" (e.g., "buckle issue") state, a "passenger not present but belt buckled" state, and a "passenger present and safely buckled" state, in some embodiments. The state of a seat may also include an "error" state, in an embodiment. Each state may be represented by a particular light color or output pattern, such as a brightness or flashing pattern, or other characteristic, or a combination of characteristics. In an embodiment, display 626 may include a layout of lights or light segments that corresponds to a shape of the seat arrangement of the vehicle.

In an embodiment, display 626 may be or may include a system of lights or other outputs distributed throughout the vehicle so as to indicate to the operator whether each seat has a passenger present and/or whether that passenger has his or her restraint secured properly and safely. For example, display 626 may comprise a system of lights in the passenger cabin, with one or more lights placed above or on each seat, with the output of that light indicative of the status of that seat.

In some embodiments, reporting module 602 may include output devices in addition to or instead of display 626. For example, reporting module 602 may include one or more speakers for audible output of a status of one or more seats, one or more vibration elements for tactile output of a status of one or more seats, and the like.

Computing device 622 may be configured to receive data indicative of the output of one or more (e.g., a plurality of) passenger sensors 300, restraint sensors 610, and extension sensors 400 and to operate display 626 or another output device to output to an operator of the vehicle the status (e.g. passenger status and/or restraint status) of one or more seats of the vehicle. Computing device 622 may be or may include a programmable controller, a microcontroller, or otherwise may include a computer-readable memory and a processor executing instructions stored in that memory to perform one or more of the functions of the computing device described herein. For example, computing device 622 may be configured to perform method 800 of FIG. 8, or portions thereof, which will be described below.

Computing device 622 may be further configured to store the respective states of one or more of the seats in a vehicle in computer-readable memory 624. Memory 624 may be or may include, for example, a non-volatile memory, such as a FLASH memory, EPROM, EEPROM, hard drive, SD memory, or other appropriate memory. Computing device 622 may be configured to store such states at one or more times, in an embodiment. For example, computing device 622 may be configured to store the respective statuses of one or more seats each time a respective status is provided, or each time a respective status changes. Additionally, or alternatively, computing device 622 may be configured to store the one or more statuses in memory 624 in response to a collision involving the vehicle, in an embodiment.

Computing device 622 may exercise some control over one or more of sensors 300, 610, 400, in some embodiments. For example, computing device 622 may be configured to disable (e.g., cut power to), reset, program (e.g., set the sensitivity of or otherwise calibrate), or otherwise provide input to one or more of the sensors, in the form of communications sent via transmitter/receiver 620. For example, computing device 622 may be configured to increase the sensitivity of passenger sensor 300 and/or restraint extension sensor 400 for a seat in which a small child will sit for a particular trip. Additionally or alternatively, computing device 622 may be configured to interpret the output of one or more sensors 300, 610, 400 differently in different scenarios, rather than programming the sensor, or to ignore the output of a sensor rather than disabling it.

Transmitter/receiver 620, shown in FIG. 6, may be configured to encrypt transmissions and to decrypt received data, in some embodiments. For example, transmitter/receiver 620 may be configured for communications with AES encryption. In embodiment, the transmitter/receiver 620 on a given vehicle may use an encryption key that is unique from other vehicles, for example, to avoid cross-talk between seating systems stored in separate vehicles that travel near to each other, and also to maintain the security of communications between the transmitter/receiver 620 and each passenger cabin module 606. The transmitter/receiver 620, and/or the computing device 622, may be configured to relate received data to a particular seat sensor module 604 and/or a particular passenger cabin module 606, based on a unique identifier attached to or included in the received data. One or more computing devices (e.g., computing device 616 or computing device 622) may be configured to perform fault diagnostics (e.g., to detect and diagnose faults in one or more components of system 600). In addition, reporting module 602 or other components of system 600 may be configured to output (e.g., on display 626) an indication of one or more faults, the causes of such faults, and/or one or more remedial actions for such faults.

It should be noted that the term "module", as used in this disclosure, may refer to either a physical collection of components, a logical collection of components, or both. For example, in an embodiment, the various components of one module (e.g., an embodiment of passenger cabin module 606) may be included in a single housing or packaging, whereas the various components of another module (e.g., an embodiment of seat sensor module 604) may be physically separate from each other. Furthermore, the components illustrated and described herein as part of one module may, in some embodiments, be a part of another module. For example, computing device 616 and/or transmitter/receiver 614 may be provided as part of a seat sensor module 604, in an embodiment.

Figure 7:
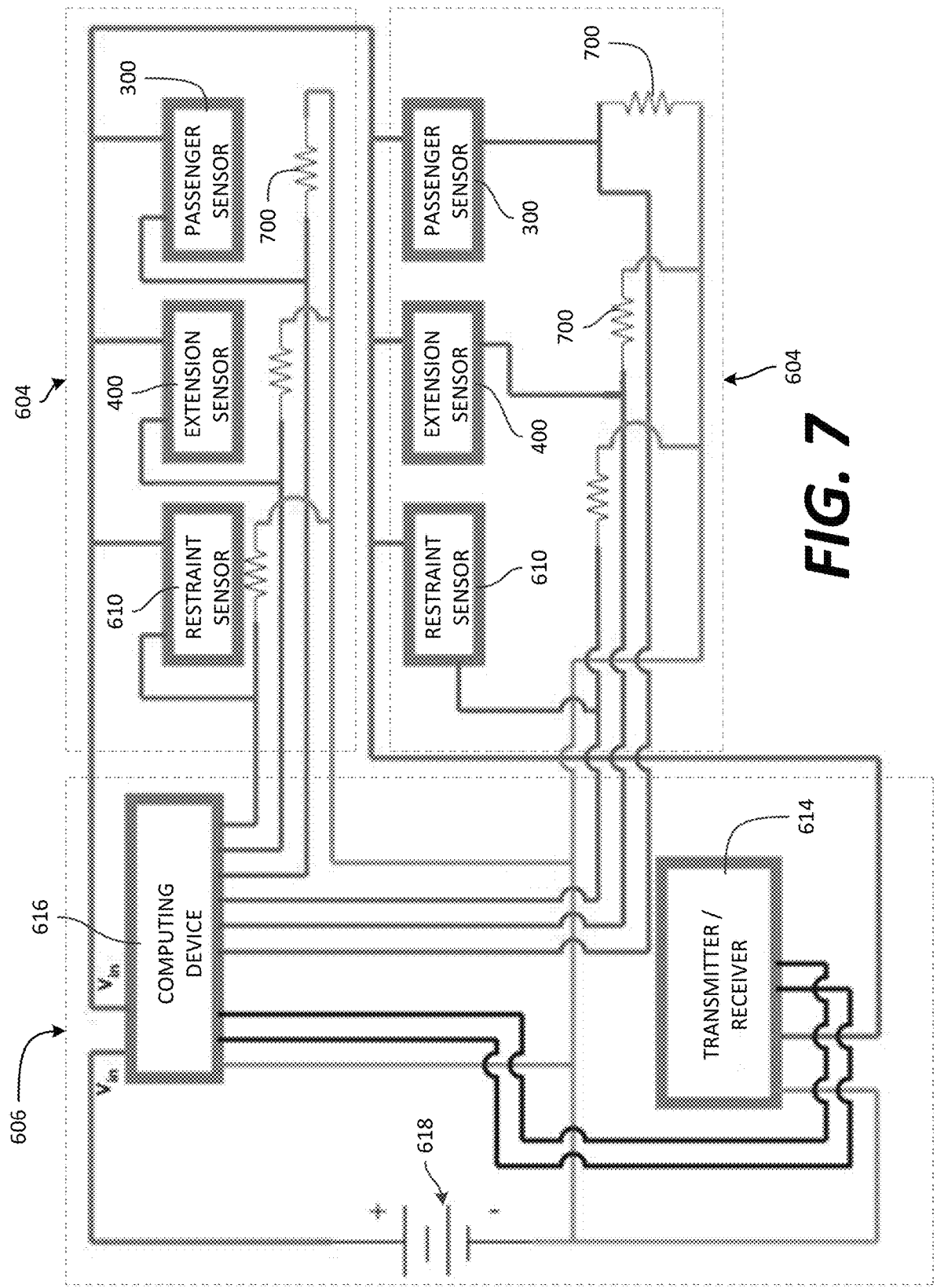
FIG. 7 is a schematic view of an example embodiment of a circuit diagram showing a passenger cabin module and two seat sensor modules that may find use in the passenger and safety restraint sensing and reporting system of FIG. 6.

FIG. 7 is a schematic view of an example embodiment of a combined passenger cabin module 606 and two seat sensor modules 604. As illustrated in FIG. 7, power source 618 may provide power to transmitter/receiver 614 and computing device 616, as well as to passenger sensors 300, restraint sensors 610, and restraint extension sensors 400.

In an embodiment, one or more of sensors 300, 610, 400 (e.g., each sensor 300, 610, 400) may include a single respective data output line that is electrically coupled with computing device 616 (e.g., for unidirectional or bidirectional communication) and that is electrically coupled with ground via a pull-down resistor 700 (for clarity of illustration, not all pull-down resistors are designated in FIG. 7). Accordingly, computing device 616 may read the output of each sensor 300, 610, 400. In an embodiment, computing device 616 may be configured to interpret the output of one or more of sensors 300, 610, 400, as will be described with respect to FIG. 8. In some embodiments, computing device 616 may also provide instructions to one or more of the sensors 300, 610, 400.

Computing device 616 may be electrically coupled with transmitter/receiver 614 for unidirectional or bidirectional communication. For example, computing device 616 may provide data to transmitter/receiver 614, indicative of the output of one or more of sensors 300, 610, 400, for transmission (e.g., to a reporting module). Transmitter/receiver 614 may transmit messages to computing device 616 (e.g., messages received from a reporting module), such as instructions for resetting or calibrating (e.g., altering the sensitivity of) sensor 300, 610, 400, for example. Transmitter/receiver 614 may operate under the instruction of computing device 616, in embodiments. In an embodiment, computing device 616 maybe configured to execute an initialization procedure (e.g., in conjunction with a reporting module) in which the computing device 616 reports the type and number of sensors to which it is coupled and receives and/or loads a library for initializing the settings and functionality of the sensors 300, 610, 400. The initialization procedure may also be used by a reporting module to establish the type, number, and layout of sensors in a vehicle. Accordingly, the reporting module may not require pre-programming before installation into a vehicle.

In an embodiment, reporting module 602 may perform an initialization procedure upon being booted up to determine the quantity, layout, and status of the seats in the vehicle. An example initialization procedure will be described with respect to FIG. 12. Briefly, upon being booted up (e.g., when the vehicle is started), the reporting module 602 may query each seat sensor module 604 (via communications with passenger cabin modules 606) and wait for a response. The response from each seat sensor module 604 may include a status of the seat sensor module 604. If no response is received from a given seat sensor module 604, the reporting module 602 may output an error state for the seat associated with that seat sensor module.

Further, in an embodiment, the computing device 616 may be configured to perform one or more diagnostic functions, such as confirming that each sensor 300, 610, 400 and transmitter/receiver 614 is functioning properly, and determining and/or correcting the cause of an error state on the part of a sensor 300, 610, 400 or transmitter/receiver 614.

Figure 8:
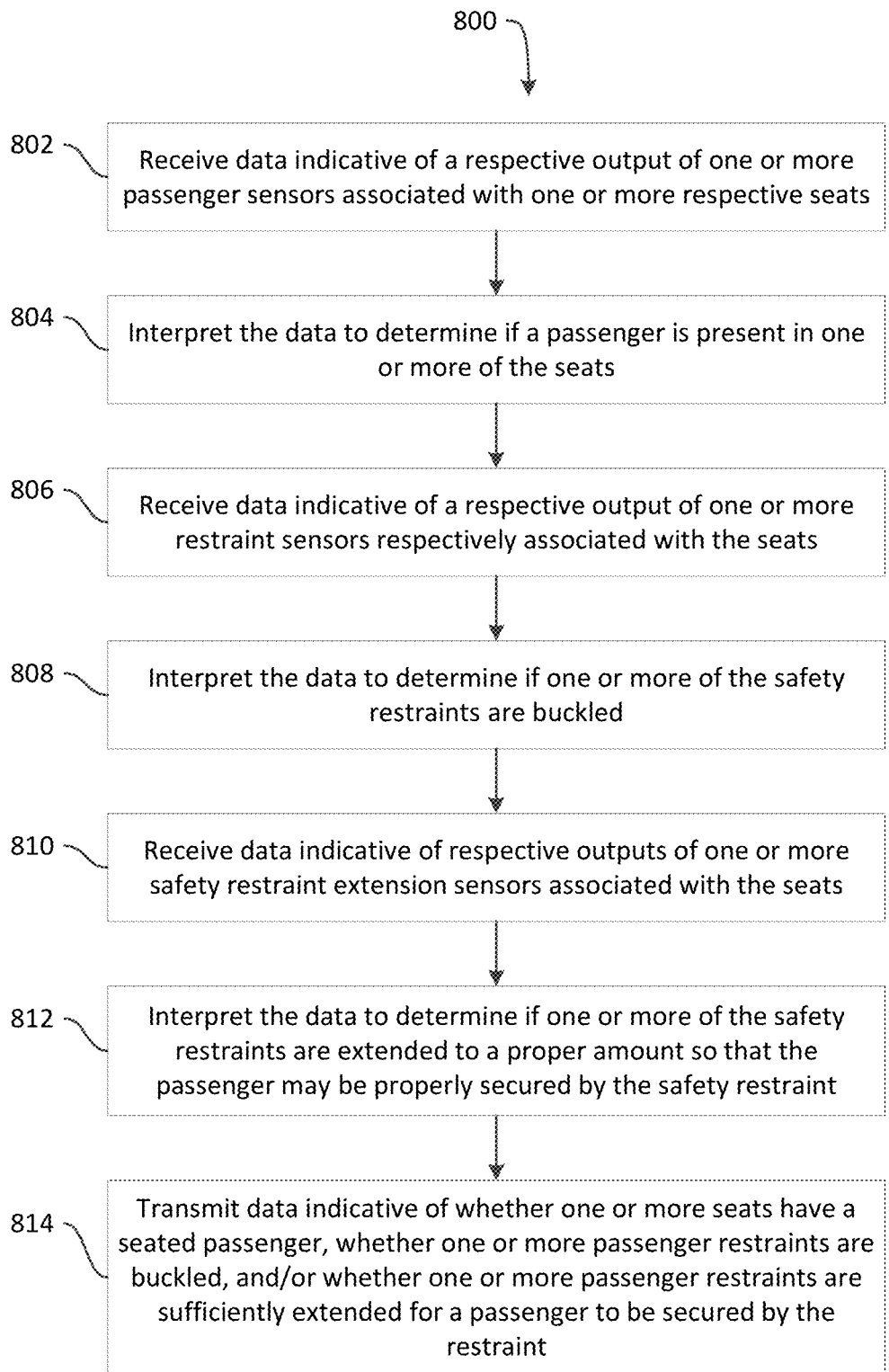
FIG. 8 is a flow chart illustrating an example method for providing data indicative of a passenger and seatbelt status of a seat in a vehicle.

FIG. 8 is a flow chart illustrating example method 800 for providing data indicative of a passenger and seatbelt status of a seat in a vehicle. For example, method 800, or portions thereof, may be performed by passenger cabin module 606 of FIGS. 4 and 5.

Method 800 may include step 802 that includes receiving data indicative of a respective output of one or more passenger sensors associated with one or more respective seats (e.g., with each seat in a vehicle). For example, the output of a passenger sensor may be received directly, such as by a computing device of a passenger cabin module, as discussed in conjunction with FIG. 7. Alternatively, the output of a passenger sensor, or data indicative of that output, may be received from an intermediate electronic device, rather than from the passenger sensor itself.

Method 800 may further include step 804 that includes interpreting the data received in step 802 to determine if a passenger is present in one or more of the seats (e.g., in each seat). For example, a computing device performing step 804 may be programmed (e.g., via lookup table or equivalent) to interpret a first binary output as indicative of the presence of a passenger, and the other binary output as indicative of a lack of a passenger in the seat. In another example, a computing device performing step 804 may be programmed to interpret ranges of values of the output of the passenger sensor (e.g., pressure values) to determine whether a passenger is present in the seat.

Method 800 may further include step 806 that includes receiving data indicative of a respective output of one or more restraint sensors respectively associated with the seats (e.g., with each seat). For example, the output of a given restraint sensor may be received directly. Alternatively, the output of a restraint sensor, or data indicative of that output, may be received from an intermediate electronic device, rather than from the restraint sensor itself.

Method 800 may further include step 808 that includes interpreting the data received in step 806 to determine if one or more of the safety restraints (e.g., each safety restraint) are buckled. For example, a computing device performing step 808 may be programmed (e.g., via lookup table or equivalent) to interpret a first binary output as indicative of a buckle of the safety restraint being buckled, and the other binary output as indicative of the safety restraint not being buckled. In another example, a computing device performing step 808 may be programmed to interpret ranges of values of the output of a restraint sensor (e.g., conductivity values) to determine whether the restraint is buckled.

Method 800 may further include step 810 that includes receiving data indicative of respective outputs of one or more safety restraint extension sensors (e.g., each restraint extension sensor) associated with the seats. For example, the output of a restraint extension sensor may be received directly. Alternatively, the output of an extension sensor, or data indicative of that output, may be received from an intermediate electronic device, rather than from the extension sensor itself.

Method 800 may further include step 812 that includes interpreting the data received in step 810 to determine if one or more of the safety restraints (e.g., each safety restraint) are extended to a proper amount so that the passenger may be properly secured by the safety restraint. For example, a computing device performing step 812 may be programmed (e.g., via lookup table or equivalent) to interpret a first binary output as indicative of the restraint being sufficiently extended (e.g., extended enough so as to go over a passenger and/or not extended so far to be unlikely to be secured on a passenger) so as to indicate a passenger being safely secured, and the other binary output as indicative of the restraint not being extended sufficiently to indicate a passenger being secured. In another example, a computing device performing step 812 may be programmed to interpret ranges of values of the output of the restraint extension sensor (e.g., extension quantity values, such as in centimeters or inches) to determine whether the restraint is extended sufficiently that a passenger may be secured in the seat.

Method 800 may further include step 814 that includes transmitting data indicative of whether one or more seats have a seated passenger, whether one or more passenger restraints are buckled, and/or whether one or more passenger restraints are sufficiently extended for a passenger to be secured by the restraint. In some embodiments, such data may be sent together in a single transmission or single set of transmissions. In other embodiments, data respective of a seated passenger, a safety restraint buckle status, or a safety restraint extension status may be sent separately. In some embodiments, the data transmitted may include the outputs of one or more passenger sensors, one or more restraint sensors, and/or one or more restraint extension sensors as that output is received in steps 802, 806, 810. Additionally or alternatively, the data transmitted may be or may include different data based on such outputs.

In some embodiments, method 800, or portions thereof, may be repeated periodically to update the current status (e.g., a passenger status, a restraint buckled status, and/or a restraint extension status) of each of one or more seats for a reporting module or other electronic device. In some embodiments, a status of one or more seats may be transmitted only when that status changes (e.g., a status may be transmitted when the most recent status is no longer true). In other embodiments, a status of one or more seats may be transmitted on a regular schedule, regardless of changes.

Figure 9:
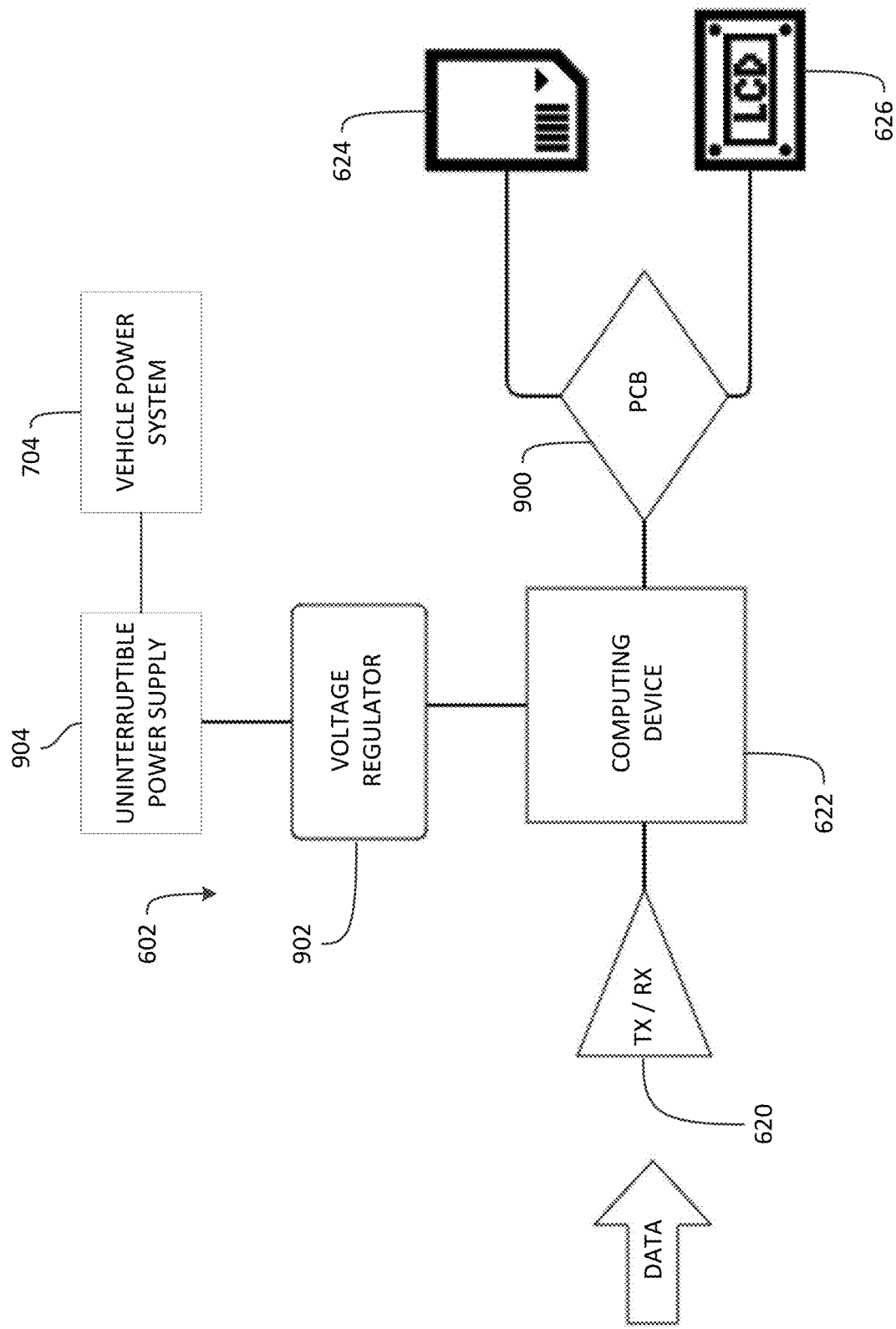
FIG. 9 is a diagrammatic and schematic view of an example embodiment of a reporting module that may find use in the passenger and safety restraint sensing and reporting system of FIG. 6.

FIG. 9 is a diagrammatic and schematic view of an example embodiment of reporting module 602. As previously described, reporting module 602 may include transmitter/receiver 620, computing device 622, memory 624, and display 626. As illustrated in FIG. 9, reporting module 602 may further include printed circuit board 900 (to which one or more of computing device 622, memory 624, and display 626 may be electrically coupled) and voltage regulator 902.

Transmitter/receiver 620 may receive data wirelessly (e.g., from one or more passenger cabin modules, as described with respect to FIGS. 6, 7, and 8), and computing device 622 may receive and use that data to operate memory 624 and display 626. Voltage regulator 902 may receive power from the vehicle electrical system 704, in an embodiment, and provide an appropriate stable voltage for computing device 622, transmitter/receiver 620, memory 624, and/or display 626.

Computing device 622 may be electrically coupled with transmitter/receiver 620 for unidirectional or bidirectional communication. For example, computing device 622 may receive data from transmitter/receiver 620, indicative of a passenger status, restraint buckled status, and/or restraint extension status of one or more seats, together with time and GPS or other location data. Transmitter/receiver 620 may transmit messages (e.g., to one or more passenger cabin modules), under control of computing device 622, such as instructions for resetting or calibrating a sensor, for example.

In some embodiments, reporting module 602 may include a geolocation module 628 that includes hardware and software for determining and outputting a location of the vehicle. The geolocation module 628 may be or may include, for example, a global positioning system (GPS) chip or module. Additionally, or alternatively, a geolocation module 628 may be included in one or more passenger cabin modules 606 and/or seat sensor modules 604.

The reporting module 602 may further include an uninterruptible power supply (UPS) 904. The uninterruptible power supply may include a power storage device, such as one or more batteries or capacitors (e.g., supercapacitors), for example. In an embodiment, the voltage regulator may draw power from the vehicle power system when the vehicle is switched on (and thus the vehicle power system is active) and from the UPS when the vehicle is switched off. The UPS may store sufficient power to enable the reporting module 602 to complete a shutdown procedure, as will be discussed in conjunction with FIG. 11. Power from the vehicle power system 704 may pass through the UPS 904, in an embodiment, to enable the UPS to detect a loss of power from the vehicle and provide substantially uninterrupted power to the voltage regulator 902. In addition, the power storage of the uninterruptible power supply may charge from the vehicle power supply 704, when power from the vehicle power supply 704 is available.

Figure 10:
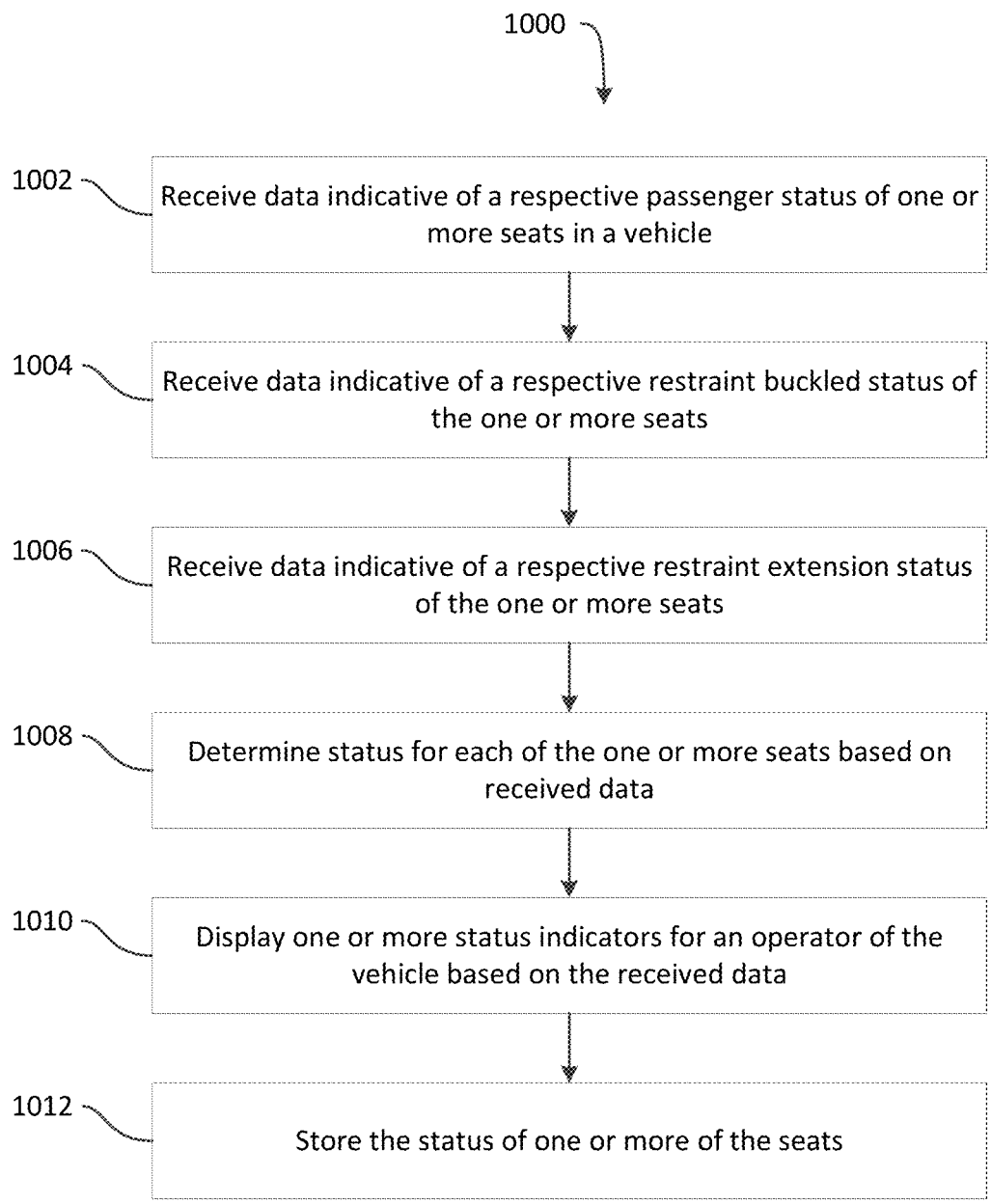
FIG. 10 is a flow chart of an example method for reporting a passenger status and safety restraint status of one or more seats in a vehicle.

FIG. 10 is a flow chart of example method 1000 for reporting a passenger and safety restraint status of one or more seats in a vehicle. For example, method 1000, or portions thereof, may be performed by a reporting module, such as reporting module 602.

Method 1000 may include step 1002 that includes receiving data indicative of a respective passenger status of one or more seats in a vehicle (e.g., of each seat). Such data may be the output of one or more passenger sensors, or other data based on an interpretation of that output. Data respective of two or more seats may be received together, or data respective of each seat may be received separately. Data may be received wirelessly, in some embodiments.

Method 1000 may further include step 1004 that includes receiving data indicative of a respective restraint buckled status of the one or more seats. Such data may be the output of one or more restraint sensors, or other data based on an interpretation of that output. Data respective of two or more seats may be received together, or data respective of each seat may be received separately. Data may be received wirelessly, in some embodiments.

Method 1000 may further include step 1006 that includes receiving data indicative of a respective restraint extension status of the one or more seats. Such data may be the output of one or more restraint extension sensors, or other data based on an interpretation of that output. Data respective of two or more seats may be received together, or data respective of each seat may be received separately. Data may be received wirelessly, in some embodiments.

Method 1000 may further include step 1008 that includes determining a status for each of the one or more seats based on received data. The status of a seat may include or subsume one or more of a passenger status, a restraint buckled status, and/or a restraint extension status, in an embodiment. The status of a seat may be found in the data received in steps 1002, 1004, 1006 (e.g., the received data may, itself, be the status or portions of the status), in an embodiment. Additionally or alternatively, determining the status of a seat may include interpreting the data received in steps 1002, 1004, and/or 1006.

Method 1000 may further include step 1010 that includes displaying one or more status indicators for an operator of the vehicle based on the received data. The one or more status indicators may include a single respective status indicator for each seat, in an embodiment, that is indicative of one or more statuses of the seat. For example, a single respective status light may be provided for each seat, with a color, brightness, pattern, or other characteristic of that light being collectively indicative of a passenger status, a restraint buckled status, and a restraint extension status, or a subcombination of such statuses, or a combination including other relevant statuses. In another embodiment, the one or more status indicators may include multiple separate status indicators for each seat. For example, for each seat, a first respective status identifier may be provided for a passenger status, a second respective status identifier may be provided for a restraint buckled status, and a third respective status identifier may be provided for a restraint extension status. Respective identifiers for one or more additional or alternative statuses or combinations of statuses may also be provided.

The one or more status indicators may be provided on a general-purpose display (e.g., a computer monitor), in an embodiment. Accordingly, displaying step 1010 may include operating a general-purpose display, or one or more portions thereof, to display one or more status indicators.

Additionally, or alternatively, the one or more status indicators may be provided on a specialized display. Accordingly, displaying step 1010 may include operating a specialized display, or one or more portions thereof, to display one or more status indicators.

Displaying step 1010 may include displaying the one or more status indicators adjacent to, on, or otherwise with respect to a diagram or labeled list of seats. For example, the one or more status indicators may be provided on a light board laid out similarly to the appearance of the diagram of FIG. 1, or portions thereof. Accordingly, displaying step 1010 may include operating such a light board.

Additionally, or alternatively, the one or more status indicators may be provided in the passenger cabin, adjacent to or on the seats themselves. For example, the one or more status indicators may be provided on the seats, above the seats, on the floor adjacent to the seats, and/or at another location that may be visible to the driver. Accordingly, displaying step 1010 may include operating one or more lights or other status indicators that are disposed in the passenger cabin.

In addition to or instead of outputting the status of one or more seats to a display, the status of one or more seats may be output in some other way. For example, an audible alert may be output if a passenger is seated, but does not have a properly-buckled or properly-extended safety restraint. In another example, a tactile feedback—such as a seat vibration—may be output to the operator of the vehicle and/or to a passenger if the passenger is seated, but does not have a properly-buckled or properly-extended safety restraint.

The method may further include step 1012 that includes storing the status of one or more of the seats. The status may include or subsume one or more of a passenger status, a restraint buckled status, or a restraint extension status. The status of a seat may be stored each time a status changes, in an embodiment, such that a current status of each seat is stored in the memory. In another embodiment, a status of a seat may be stored for seats in which passengers are seated. In another embodiment, the status of the seats may be stored in response to certain events, such as a collision involving a vehicle in which the method is being performed. Along with the status of the seats, time and GPS or other location data may be stored. Furthermore, the status of one or more seats (e.g., each seat) may be locked in response to certain events, such as a collision, such that the memory may serve as a "black box."

In an embodiment, one or more of the interpreting steps 804, 808, 812 of the method 800 of FIG. 8 may additionally or alternatively be included as steps in method 1000 of FIG. 10. Accordingly, a device or module performing the method 1000 of FIG. 10 may be configured to interpret data received from one or more sensors (e.g., passenger sensors, restraint sensors, and/or restraint extension sensors) to determine a respective status of one or more seats (e.g., a passenger status, restraint status, and/or restraint extension status).

In some embodiments, method 1000, or portions thereof, may be repeated periodically to output the current status (e.g., a passenger seated status, a restraint buckled status, and/or a restraint extension status) of each of one or more seats. In some embodiments, a status of one or more seats may be output only when that status changes, or only when that status indicates a problem (e.g., a passenger seated but not properly secured, or a passenger not seated in a seat for which a passenger is expected, etc.). In other embodiments, a status of one or more seats may be output continuously regardless of status or changes thereto.

Figure 11:
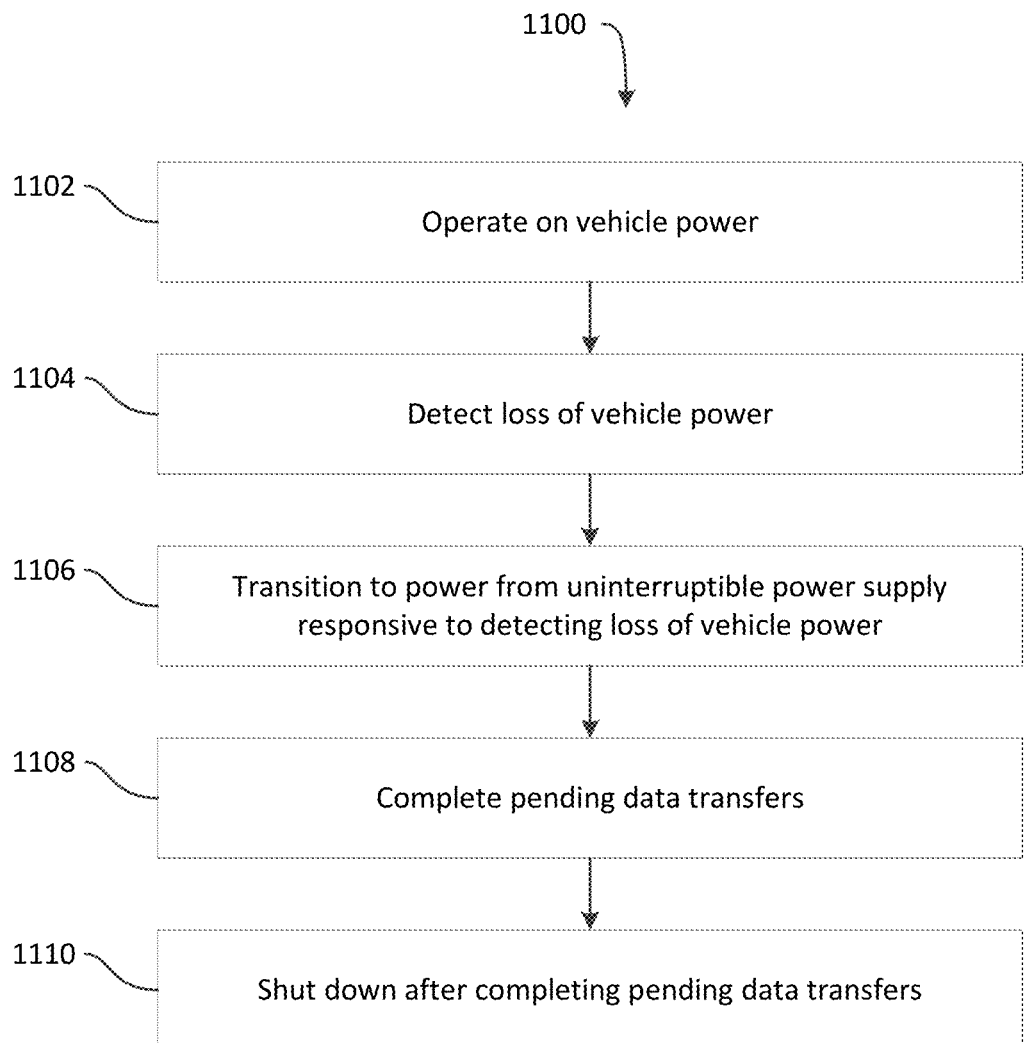
FIG. 11 is a flow chart illustrating an example method for shutting down a reporting module of a passenger and safety restraint sensing and reporting system.

FIG. 11 is a flow chart illustrating an example method 1100 for shutting down a reporting module. For example, method 1100, or portions thereof, may be performed by a reporting module, such reporting module 602, that includes or is electrically coupled with an uninterruptible power supply. Method 1100 may be performed by such a reporting module to avoid abrupt loss of power when a vehicle power system deactivates, which abrupt loss of power may lead to data corruption. Method 1100 of FIG. 11 advantageously enables a reporting module, such as reporting module 602, that receives power from a vehicle power system and maintains power after the vehicle is turned off for long enough to avoid interrupting data transfers that may corrupt a memory device, such as memory device 624.

Method 1100 may include a step 1102 that includes operating on vehicle power. Step 1102 may include, for example, the reporting module operating substantially as illustrated and described throughout this disclosure while being powered by the electrical system of the vehicle in which the reporting module is installed.

Method 1100 may further include a step 1104 that includes detecting a loss of vehicle power. The loss of vehicle power may be detected by circuitry of an uninterruptible power supply, in an embodiment. Additionally or alternatively, detecting a loss of vehicle power may include a computing device of the reporting unit receiving an indication that vehicle power has been lost from the uninterruptible power supply, for example. Such an indication may inform the reporting unit that it should initiate a shutdown procedure.

Method 1100 may further include a step 1106 that includes transitioning to power from an uninterruptible power supply in response to detecting the loss of vehicle power. The transition from vehicle power to UPS power may be transparent to the electronic components of the reporting unit, in an embodiment, and may be performed by circuitry of the UPS so as to provide substantially uninterrupted power to the electronics of the reporting module.

Method 1100 may further include a step 1108 that includes completing pending data transfers. Data transfers may be pending in that data may have been received, but not yet stored in memory. Additionally or alternatively, data transfers may be pending in the sense that one or more write operations may have begun to write data to memory, but the write operations have not been completed. Completing pending data transfers may include, for example, transferring the status of one or more seats or sensors into storage, such as the memory 624 of the reporting module 602 of FIG. 6, for example.

Method 1100 may further include a step 1110 that includes shutting down after completing pending data transfers. Once data transfers are complete, reporting module 602 may execute a power-down procedure, for example.

Figure 12:
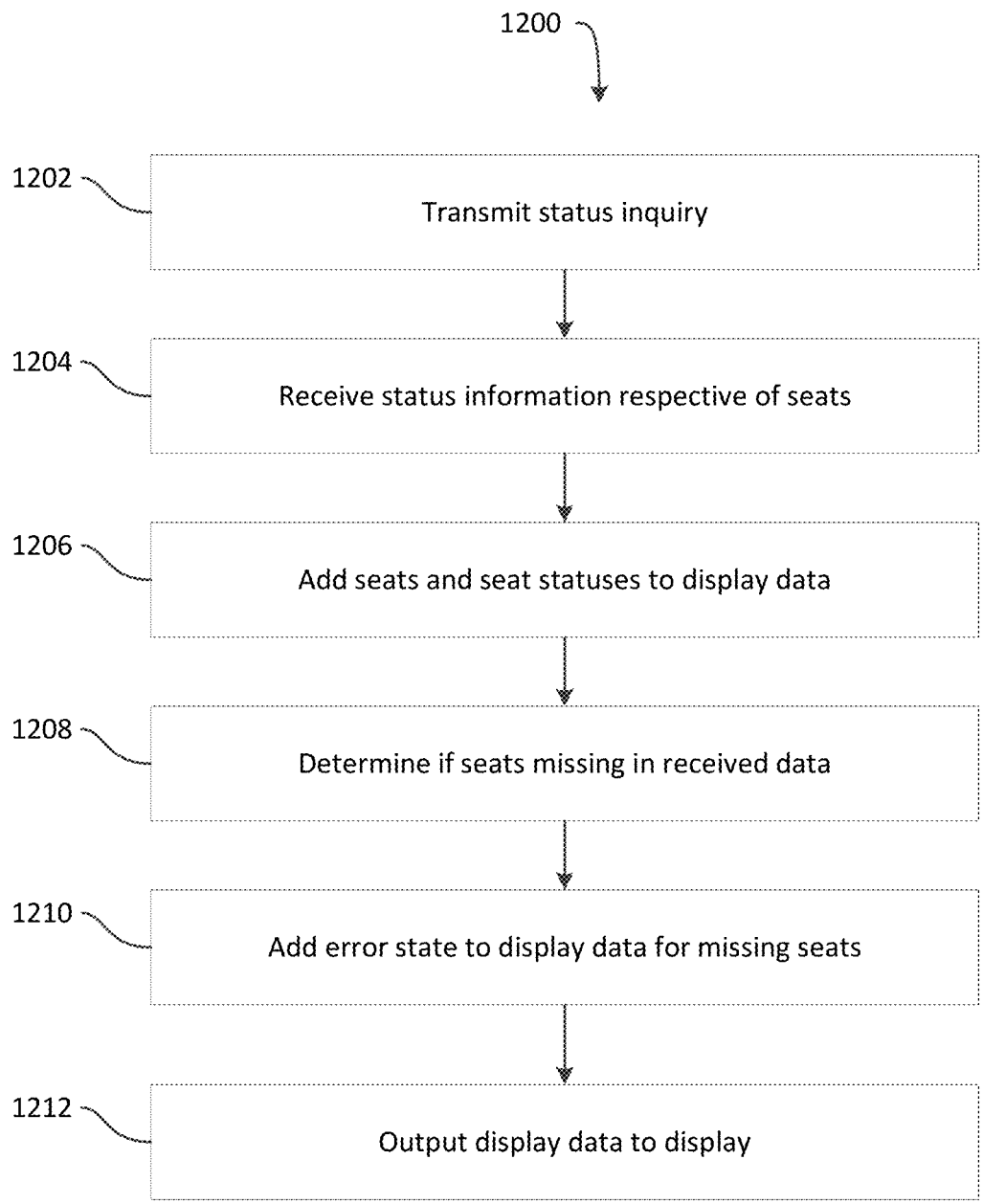
FIG. 12 is a flow chart illustrating an example method of initializing a reporting module of a passenger and safety restraint sensing and reporting system.

FIG. 12 is a flow chart illustrating an example method of initializing a reporting module for a passenger and safety restraint sensing and reporting system. Method 1200 may be performed by a reporting module, such as reporting module 602 of FIG. 6. Method 1200 includes a series of steps by which a seating layout, and the respective statuses of those seats, may be dynamically created upon startup of a vehicle.

Method 1200 may include step 1202 that includes transmitting a status inquiry. The status inquiry may be a general inquiry, in an embodiment, not a specific inquiry to a specific unit or module. In some embodiments, the status inquiry step 1202 may include transmitting both one or more specific status inquiries to one or more specific units or modules and a general status inquiry.

Method 1200 may further include step 1204 that includes receiving status information respective of one or more seats. The status information may have been transmitted in response to the status inquiry at step 1202, in some embodiments. The status information may include, as described herein, information respective of the status of a seat belt sensor, a passenger sensor, a restraint sensor, and/or an extension sensor respective of each of the one or more seats. The received status information may include, for each seat, data indicative of the location of the seat in the vehicle (e.g., row 3 left aisle, row 3 left window, row 5 right middle, and so on). Thus, the respective locations of a plurality of seats in the vehicle may be determined based on the received status information.

Method 1200 may further include step 1206 that includes adding the one or more seats for which data was received at step 1206, and their respective statuses, to display data. The seats may be added to the display data according to the received data indicative of the seat locations, and the received sensor status data. The display data may thus include a partial or complete layout of the seats in the vehicle.

Method 1200 may further include step 1208 that includes determining if any seats are missing from the status information received in step 1204. Seats may be determined to be missing inferentially, in certain embodiments. For example, if data is received respective of a row 3 left window seat and a row 3 left middle seat, but no row 3 left aisle seat, it may be inferred that a row 3 left aisle seat should be present. Additionally or alternatively, seats may be determined to be missing based on previous initialization procedures. For example, a seating configuration may be stored between boot cycles of the system (which seating configuration may comprise the display data or may otherwise be created according to method 1200, for example), and seats included in the stored seating configuration, but not included in the data received at step 1204, may be determined to be missing.

Method 1200 may further include step 1210 that includes adding an error state to the display data for any missing seats. The error state may include adding, to the display data, a respective seat where each respective missing seat is expected, along with an indication that such seat is in an error state.

Method 1200 may further include step 1212 that includes outputting the display data to a display. The display may thus be operated to show a user—e.g., an operator of the vehicle-a mapped layout of the seats in the vehicle and the status of each of those seats. FIG. 1 illustrates an example of such a mapped layout. After performing method 1200 upon startup of the vehicle, method 800, or portions thereof, may be performed periodically to obtain an updated status of one or more of the seats of the vehicle. Accordingly, after generating the graphical layout of the plurality of seats of the vehicle according to method 1200, a request for an updated passenger status and an updated restraint status for each of the seats may be transmitted, and responses to the request may be received. Received responses may include updated passenger statuses and respective updated restraint statuses for some, but not all, of the plurality of seats. If it is determined that a response to the request for an updated status has not been received with respect to one or more seats, the display data may be updated with an error state for the one or more seats for which no response was received, and the display may be operated to output the graphical layout of the plurality of seats, the graphical layout comprising an error condition for the one or more seats for which a response to the request was not received.

While this disclosure has described certain embodiments, it will be understood that the claims are not intended to be limited to these embodiments except as explicitly recited in the claims. On the contrary, the instant disclosure is intended to cover alternatives, modifications and equivalents, which may be included within the spirit and scope of the disclosure. Furthermore, in the detailed description of the present disclosure, numerous specific details are set forth in order to provide a thorough understanding of the disclosed embodiments. However, it will be obvious to one of ordinary skill in the art that systems and methods consistent with this disclosure may be practiced without these specific details. In other instances, well known methods, procedures, components, and circuits have not been described in detail as not to unnecessarily obscure various aspects of the present disclosure.

Some portions of the detailed descriptions of this disclosure have been presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic data capable of being stored, transferred, combined, compared, and otherwise manipulated in a computer system or similar electronic computing device. For reasons of convenience, and with reference to common usage, such data is referred to as bits, values, elements, symbols, characters, terms, numbers, or the like, with reference to various embodiments of the present invention. It should be borne in mind, however, that these terms are to be interpreted as referencing physical manipulations and quantities and are merely convenient labels that should be interpreted further in view of terms commonly used in the art.

Unless specifically stated otherwise, as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers, or other such information storage, transmission, or display devices as described herein or otherwise understood to one of ordinary skill in the art.

Several methods, processes, and algorithms are set forth herein as comprising one or more "steps." Such steps are not required to be performed in any particular order except as mandated by logic or as specifically set forth in the claims.

What is claimed is:

1. A reporting module for a seat sensing system for a vehicle, the reporting module comprising:
    a display configured to be disposed proximate an operator of the vehicle;
    a receiver configured to receive wireless communications; and
    a computing device configured to:
       determine, according to the received wireless communications, the respective locations of a plurality of seats in the vehicle;
       generate a graphical layout of the plurality of seats according to the determined locations;
       determine a passenger status and restraint status of each of the plurality of seats in the vehicle based on the communications; and
       operate the display to output the graphical layout of the plurality of seats, the graphical layout comprising the passenger status and restraint status of each of the plurality of seats, for the operator of the vehicle;
       wherein the received wireless communications include, for each of the plurality of seats, a respective row and respective position within the row, wherein the computing device is configured to determine the respective locations of the plurality of seats according to the respective rows and respective positions;
    the reporting module further comprising a transmitter configured to transmit wireless communications, wherein the computing device is further configured to:
       after generating the graphical layout of the plurality of seats, transmit, via the wireless transmitter, a request for an updated passenger status and an updated restraint status for the plurality of seats;
       receive, via the receiver, one or responses to the request, the responses comprising respective updated passenger statuses and respective updated restraint statuses for some, but not all, of the plurality of seats;
       determine, based on the one or more responses, that a response to the request has not been received with respect to one or more seats; and
       operate the display to output the graphical layout of the plurality of seats, the graphical layout comprising an error condition for the one or more seats for which a response to the request was not received.

2. The reporting module of claim 1, wherein the computing device is further configured to:
    transmit a signal for a passenger sensor or a restraint sensor that alters the sensitivity of the passenger sensor or the restraint sensor; or
    interpret the data from the transmitter according to a size of a passenger that is expected to be seated in one of the plurality of seats.

3. A reporting module for a seat sensing system for a vehicle, the reporting module comprising:
    a display configured to be disposed proximate an operator of the vehicle;
    a transmitter configured to transmit wireless communications;
    a receiver configured to receive wireless communications; and
    a computing device configured to:
       determine, according to the received wireless communications, the respective locations of a plurality of seats in the vehicle;
       generate a graphical layout of the plurality of seats according to the determined locations;
       determine a passenger status and restraint status of each of the plurality of seats in the vehicle based on the communications;
       operate the display to output the graphical layout of the plurality of seats, the graphical layout comprising the passenger status and restraint status of each of the plurality of seats, for the operator of the vehicle;
       after generating the graphical layout of the plurality of seats, transmit a request for an updated passenger status and an updated restraint status for the plurality of seats;
       receive, via the receiver, one or responses to the request, the responses comprising respective updated passenger statuses and respective updated restraint statuses for some, but not all, of the plurality of seats;
       determine, based on the one or more responses, that a response to the request has not been received with respect to one or more seats; and
       operate the display to output the graphical layout of the plurality of seats, the graphical layout comprising an error condition for the one or more seats for which a response to the request was not received.

4. The reporting module of claim 1, wherein the reporting module is configured to encrypt communications using a unique encryption key.

5. The reporting module of claim 1, further comprising a memory, wherein the reporting module is configured to store, in the memory, a date, time, and location of the vehicle and the passenger status and the restraint status of each of the plurality of seats responsive to an event.

6. The reporting module of claim 1, further comprising one or more speakers, wherein the reporting module is configured to output an audible output of a status of one or more seats.

7. The system of claim 3, wherein the reporting module comprises one or more speakers for audible output of a status of one or more seats.

8. The reporting module of claim 3, wherein the reporting module is configured to operate a vibration element to provide tactile output of one or more of the passenger status or the restraint status of one or more of the plurality of seats to the operator of the vehicle.

9. The reporting module of claim 3, wherein the display comprises a plurality of light segments, each segment associated with a respective seat, a color or output pattern of each of the light segments indicative of the status of the respective seat.

10. The reporting module of claim 3, wherein the computing device is further configured to:
transmit a signal for a passenger sensor or a restraint sensor that alters the sensitivity of the passenger sensor or the restraint sensor; or
interpret the data from the transmitter according to a size of a passenger that is expected to be seated in one of the plurality of seats.

11. The reporting module of claim 3, wherein the reporting module is configured to encrypt communications using a unique encryption key.

12. The reporting module of claim 3, further comprising a memory, wherein the reporting module is configured to store, in the memory, a date, time, and location of the vehicle and the passenger status and the restraint status of each of the plurality of seats responsive to an event.

13. The reporting module of claim 1, wherein the reporting module is configured to operate a vibration element to provide tactile output of one or more of the passenger status or the restraint status of one or more of the plurality of seats to the operator of the vehicle.

14. The reporting module of claim 1, wherein the display comprises a plurality of light segments, each segment associated with a respective seat, a color or output pattern of each of the light segments indicative of the status of the respective seat.

15. A system comprising:
the reporting module of claim 1; and
one or more visible status indicators configured to be disposed in a passenger cabin of the vehicle, the one or more status indicators displaying the passenger status and restraint status of the plurality of seats.

16. A system comprising:
the reporting module of claim 3; and
one or more visible status indicators configured to be disposed in a passenger cabin of the vehicle, the one or more status indicators displaying the passenger status and restraint status of the plurality of seats.

17. The reporting module of claim 1, wherein the reporting module is configured to store the respective statuses of one or more of the seats a plurality of times for seat belt utilization determination.

18. The reporting module of claim 3, wherein the reporting module is configured to store the respective statuses of one or more of the seats a plurality of times for seat belt utilization determination.

* * * * *